United States Patent Office 2,835,757
Patented May 20, 1958

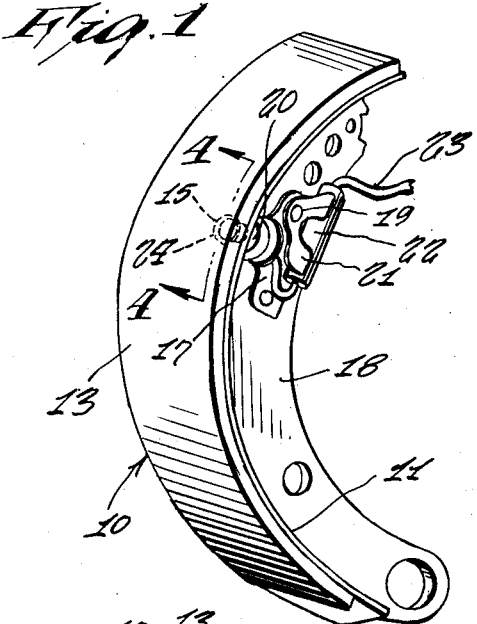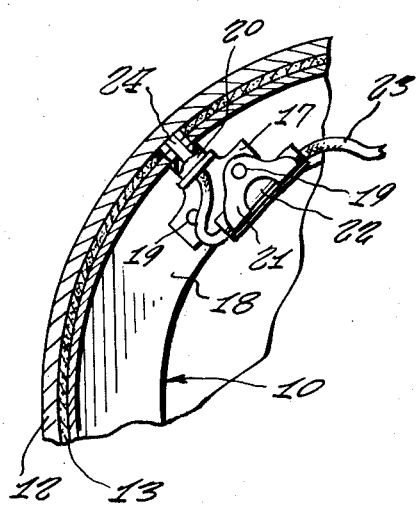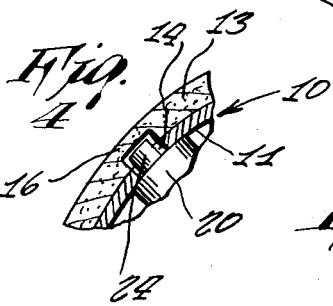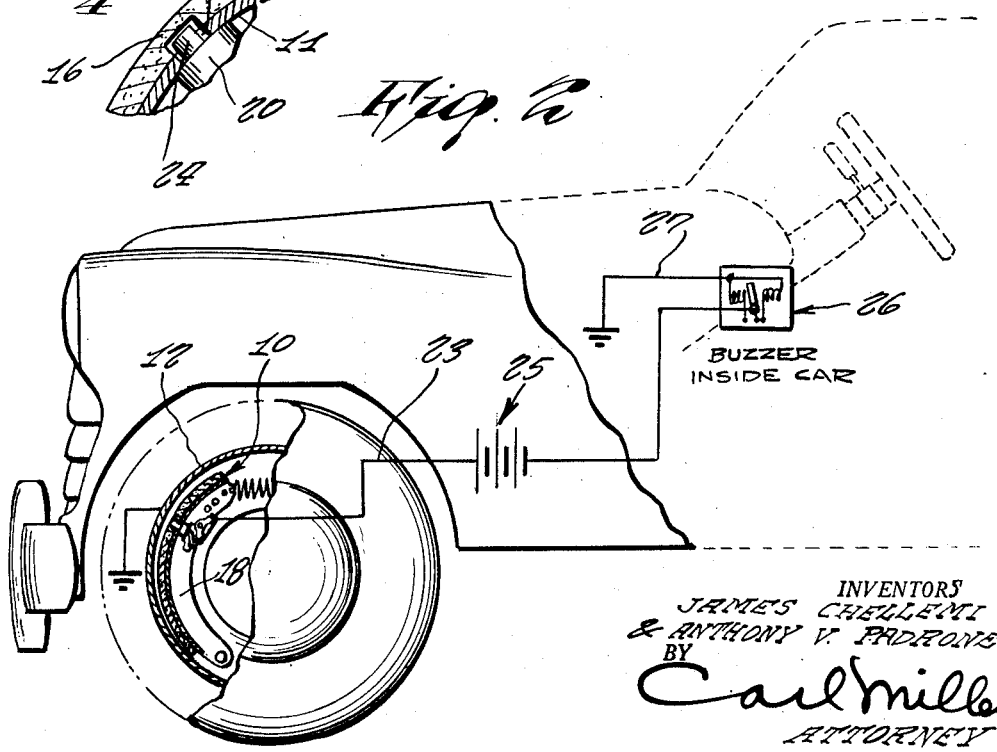

2,835,757

WORN BRAKE LINING BUZZER

James Chellemi, Brooklyn, and Anthony V. Padrone, Forest Hills, N. Y.

Application May 9, 1955, Serial No. 506,882

1 Claim. (Cl. 200—61.4)

This invention relates to warning devices.

It is an object of the present invention to provide a warning device for vehicles which will automatically sound upon applying the brakes when the brake lining has become worn.

It is another object of the present invention to provide a warning device of the above type which is mounted within the conventional brake shoe and includes a contact which will contact the drum upon the brake lining being worn out to close a circuit which will sound a warning buzzer to the operator when the brakes are applied.

Other objects of the present invention are to provide a warning device of the above type having the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a perspective view of a conventional brake shoe showing the invention incorporated thereon;

Fig. 2 is a diagrammatic view showing the circuit for operating the invention;

Fig. 3 is a fragmentary vertical sectional view illustrating the brake lining worn down and the contact forming a part of the invention making electrical contact with the brake drum to sound the buzzer; and Fig. 4 is a fragmentary vertical sectional view similar to Fig. 3 but showing the contact in position before the brake lining has become worn down.

Referring now more in detail to the drawing, 10 indicates generally a conventional brake shoe including the usual arcuate plate 11 which is forced against the brake drum 12 in a manner well known to those skilled in the art upon pressing the brake pedal. The usual brake lining 13 is positioned on the plate 11 intermediate the brake drum 10 and the drum 12.

In the practice of my invention, the plate 11 (Fig. 4) is provided with an opening 14 therethrough which is aligned with a cylindrical opening 15 provided on the inner surface of the lining 13 and extending partially therethrough. It will be noted that the opening 15 does not extend entirely through the brake lining 13, leaving a wall 16 of substantially 1/16 of an inch thick. A clamp 17 is secured to the central plate 18 of the shoe 10 by means of the rivets 19 or other suitable fastening means, the plate 17 fixedly mounting a hollow cylindrical insulator member 20, one end of which abuts the plate 11 surrounding the opening 14 therein. A second clamp 21 is mounted on the shoe by means of one of the rivets 19 (Fig. 3) and fixedly mounts a hollow cylindrical sleeve 22 which receives therethrough the insulated conductor or wire 23. The end of the wire 23 extends through the insulator 20 and is in electrical contact with the contact 24 positioned within the insulator member 20. As shown in Fig. 4, the contact 24 extends through the opening 14 in the plate 11 in freely spaced relationship thereto and extends into the bore 15 of the brake lining 13. It will be apparent that the contact 24 is normally separated from the drum 12 upon application of the brakes by the thickness or wall 16 of the brake lining (Fig. 4). The other end of the wire 23 (Fig. 2) is connected to a source of electromotive force indicated generally at 25, the other terminal of the electromotive source 25 being connected to one terminal of the buzzer indicated generally at 26 and mounted in suitable manner on the dashboard of the car. The other terminal of the buzzer 26, which may be of any suitable type, is grounded by means of the conductor 27.

In operation, upon application of the brakes of the car, the shoe 10 and the brake lining 13 thereof will move against the drum 12 in the usual manner, the thickness of the wall 16 of the brake lining normally separating the contact 24 from the brake drum whereby to prevent the closing of the buzzer circuit. However, when the brake lining 13 becomes worn, as shown in Fig. 3, the thickness 16 will be worn away and the contact 24 will come in direct contact with the drum 12 whenever the brakes are applied. This will close the circuit and cause the buzzer 26 to sound inside the car, thus automatically warning the motorist that the brake lining has become worn.

The bore 14 is drilled from the inside of the shoe and extends partially through the brake lining 13 (about 1/16 of an inch).

While various changes may be made in the detail construction, it shall be understood that such changes shall be within the spirit and scope of the present invention as defined by the appended claim.

Having thus set forth and disclosed the nature of our invention, what is claimed is:

In combination with a brake shoe having an outwardly disposed convex surface adapted to be mounted adjacent to a brake drum, a brake lining having an inwardly disposed concave surface in mating engagement with said convex surface of said brake shoe, an opening extending through said brake shoe, portions of said lining defining a recess in said concave surface in communication with said opening through said brake shoe and extending only partially through said lining, an electrical contact extending through said opening and into said recess in freely spaced relationship thereto, said contact upon the outer surface of said lining being worn down, being adapted to engage said brake drum to close an electrical circuit therethrough.

References Cited in the file of this patent

UNITED STATES PATENTS

| | | |
|---|---|---|
| 2,146,357 | Schweikle | Feb. 7, 1939 |
| 2,217,176 | Madison | Oct. 8, 1940 |
| 2,636,090 | Branchofsky | Apr. 21, 1953 |